April 15, 1969 J. M. EASTMAN 3,438,258
FLUIDIC TEMPERATURE SENSOR AND PRESSURE REGULATOR
Filed June 9, 1967 Sheet 1 of 2

INVENTOR.
JAMES M. EASTMAN
BY
Gordon H. Chan
AGENT

United States Patent Office

3,438,258
Patented Apr. 15, 1969

3,438,258
FLUIDIC TEMPERATURE SENSOR AND PRESSURE REGULATOR
James M. Eastman, South Bend, Ind., assignor to The Bendix Corporation, a corporation of Delaware
Filed June 9, 1967, Ser. No. 644,898
Int. Cl. G01l 7/00
U.S. Cl. 73—388    5 Claims

ABSTRACT OF THE DISCLOSURE

A temperature sensing and fluid pressure regulating apparatus having a gas transmitting conduit provided with a laminar flow restriction and a sonic flow restriction downstream from and in series with the laminar flow restriction. A gas pressure drop generated across the laminar flow restriction is an essentially linear function of the temperature of the gas flowing therethrough thereby providing a sensible pressure signal indicative of the gas temperature. By varying the area of the sonic flow restriction as a function of the gas temperature, the gas pressure drop across the laminar flow restriction may be maintained substantially constant and regulated relative to the supply gas pressure for control purposes.

*Background of the invention*

The present invention relates to apparatus for sensing the temperature of a heated gas and/or regulating a fixed gas pressure differential in response to variations in the supply pressure of the gas.

In general, existing temperature sensing devices are not entirely satisfactory for use in certain applications by virtue of a relatively complex arrangement of mechanical components which result in a bulky and/or weighty unit. Existing temperature sensing devices are not particularly adapted for use in sensing relatively high temperatures in that the material of the temperature sensing unit cannot withstand the effects of heat and/or erosion in the case of high velocity gas flow for a significant length of time thereby becoming unreliable and/or inoperative. The maintenance of such devices becomes a significant problem.

In control systems operating with control fluid pressures, it is sometimes desired to generate a control fluid pressure differential which remains at a constant value regardless of changes in one of the two fluid pressures defining the pressure differential. Normally, such a requirement involves a control mechanism having diaphragms, springs and/or levers or the like elements to accomplish the desired function which elements add to the complexity, weight, size andor cost of the resulting control system.

*Summary of the invention*

The present invention provides a temperature sensing and fluid pressure regulating device of the fluidic type which requires no moving mechanical parts and is particularly adapted for use with a relatively high temperature gas. It is an object of the present invention to provide a structurally simple and reliable temperature sensor and/or fluid pressure regulator. Other objects and advantages of the present invention will be apparent from the following description and associated drawings.

*Description of the preferred embodiments*

Figure 1:
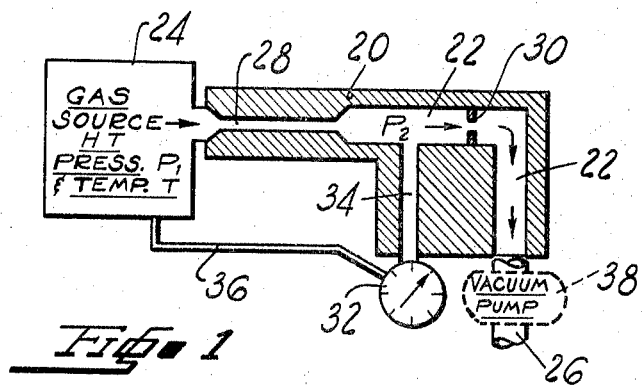
FIGURE 1 is a schematic representation of a temperature sensor and fluid pressure regulator embodying the present invention.

Referring to FIGURE 1, numeral 20 designates a casing forming a conduit 22 connected to a source of heated gas 24 and adapted to transmit a flow of gas therefrom to an exhaust source 26. A fixed area laminar flow restriction 28 and a choked or sonic flow fixed area restriction 30 downstream therefrom are arranged in series in conduit 22. A conventional pressure differential responsive gauge generally indicated by 32 is connected via a passage 34 to conduit 22 at pressure $P_2$ between restrictions 28 and 30 and via a passage 36 to the gas source at pressure $P_1$. The gauge 32 is responsive to variations in pressure $P_1$ and/or $P_2$ and may be calibrated in terms of degrees temperature or lbs./sq. in. for visual interpretation or may provide an output force signal for control purposes as desired.

In the following description, it will be assumed that the gas source 24 is air at variable temperature T. The laminar flow restriction 28 has the property that the pressure differential, $P_1-P_2$, thereacross is proportional to the product of the viscosity and volume flow of the air passing therethrough and is independent of the pressure level of the air. The pressure differential $P_1-P_2$ is defined by the so-called Hagen-Poiseuille Law in the form of the following equation:

(1)    $$P_1-P_2 = \frac{128\mu\, lQ}{\pi d^4}$$

wherein $\mu$ is absolute dynamic viscosity of the air in lb. sec./in.$^2$, $l$ is the length in inches of the laminar flow restriction 28, Q is the mean volumetric flow rate in in.$^3$/sec. through laminar flow restriction 28 and $d$ is the diameter in inches of the laminar flow restriction 28.

A choked or sonic flow restriction has an input volumetric flow proportional to the square root of the temperature of air flow therethrough and independent of the pressure level of the air. The flow rate through the choked restriction 30 may be defined by equation:

(2)    $$Q_1 = 345\, A\sqrt{T}$$

wherein A is the flow area of the choked restriction 30, T is the temperature in degree Rankine of the air and the lumped constant 345 represents the usual flow coefficient, and a function of the gas constant R and the specific heat ratio K.

If the pressure differential $P_1-P_2$ across restriction 28 is a small fraction of the pressure $P_1$, the flow rate Q through restriction 28 is substantially equal to the flow rate $Q_1$ into sonic restriction 30. Substituting $Q_1$ for $Q$ in Equation 1 results in:

(3) $$P_1-P_2=\frac{128\mu l(345A\sqrt{T})}{\pi d^4}$$

which, by combining the constants therein, reduces to:

(4) $$P_1-P_2=Cf(T)$$

wherein C is a constant depending on geometry of the elements in the flow circuit and $f(T)$ includes the temperature effect on air viscosity. Since air viscosity varies approximately as $\sqrt{T}$, $P_1-P_2$ varies nearly in linear proportion with T. Reference is made to the curve of FIGURE 5 for a typical relationship between the pressure differential $P_1-P_2$ across laminar flow restriction 28 and temperature T of the air flow therethrough.

Figure 4:
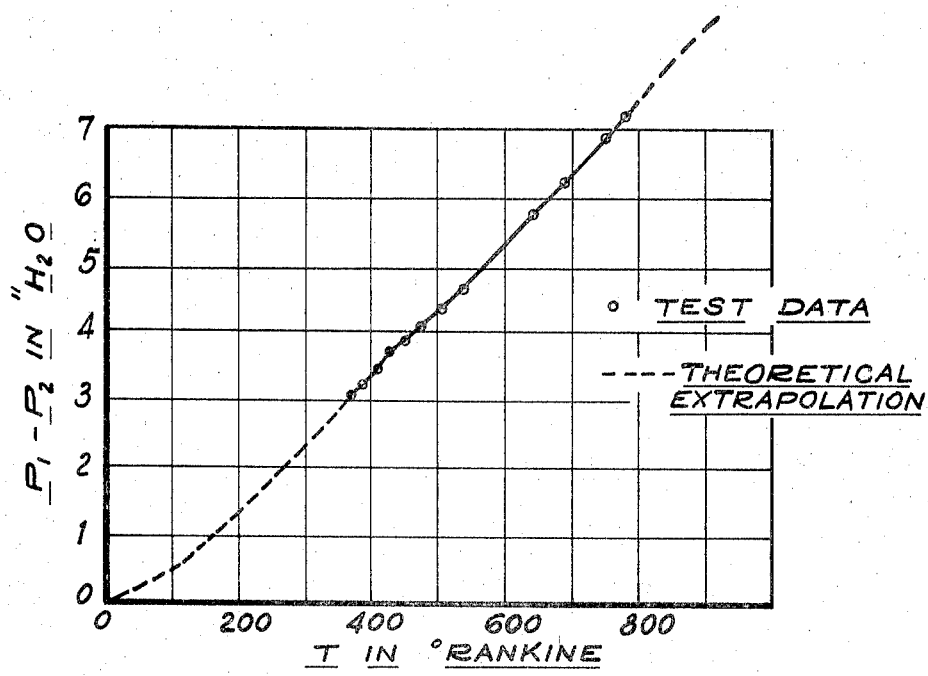
FIGURE 4 is a curve showing the relationship between fluid temperature, T, and a fluid pressure differential, $P_1-P_2$, generated as a function of the temperature T.

The curve of FIGURE 4 indicates test data obtained by flowing heated air through a laminar flow restriction 28 of .00485″ cross sectional flow area and .5″ long, a choked restriction 30 of .016″ flow area, a pressure $P_1$ 30 p.s.i.a. and an exhaust source 26 pressure of 15 p.s.i.a. The laminar flow restriction 28 and choked restriction 30 as well as the conduit 22 interconnecting the same were maintained at substantially the temperature T of the heated air source.

The conduit 22 may be maintained at the temperature T of the source 24 by exposing the casing 20 to the heated air therein or the casing 20 may be suitably insulated to minimize heat loss outwardly from conduit 22. The exhaust source 26 may be the atmosphere providing the pressure of the air at source 24 is higher by a ratio of 2 or more to establish sonic flow through restriction 30. In the event the pressure $P_1$ of source 24 is not sufficiently high to ensure the abovementioned pressure ratio, a conventional vacuum pump 38 generally shown in dashed outline may be connected to the outlet of conduit 22 to reduce the exhaust pressure thereof to the level required to maintain the pressure ratio at 2 or more.

Figure 2:
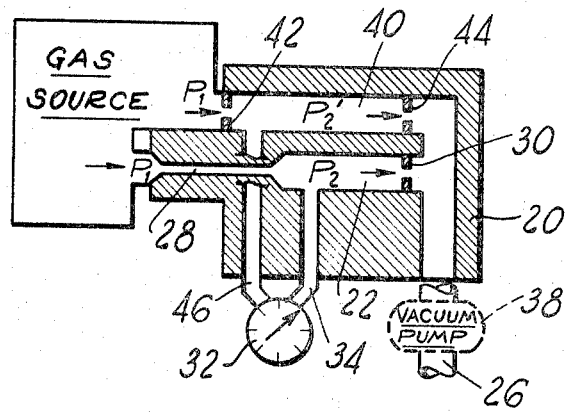
FIGURE 2 is a schematic representation of a modified form of temperature sensor and fluid pressure regulator embodying the present invention.

FIGURE 2 includes structure of FIGURE 1 which structure is defined by like numerals. A second conduit 40 connects the gas source with conduit 22 downstream of sonic restriction 30 and contains a subsonic flow restriction 42 and a sonic flow restriction 44 downstream from and in series with restriction 42. The pressure differential responsive gauge 32 is connected to pressure $P_2$ via passage 34 and pressure $P_2'$ intermediate restrictions 42 and 44 via passage 46 to thereby respond to the pressure differential $P_2'-P_2$.

Figure 5:
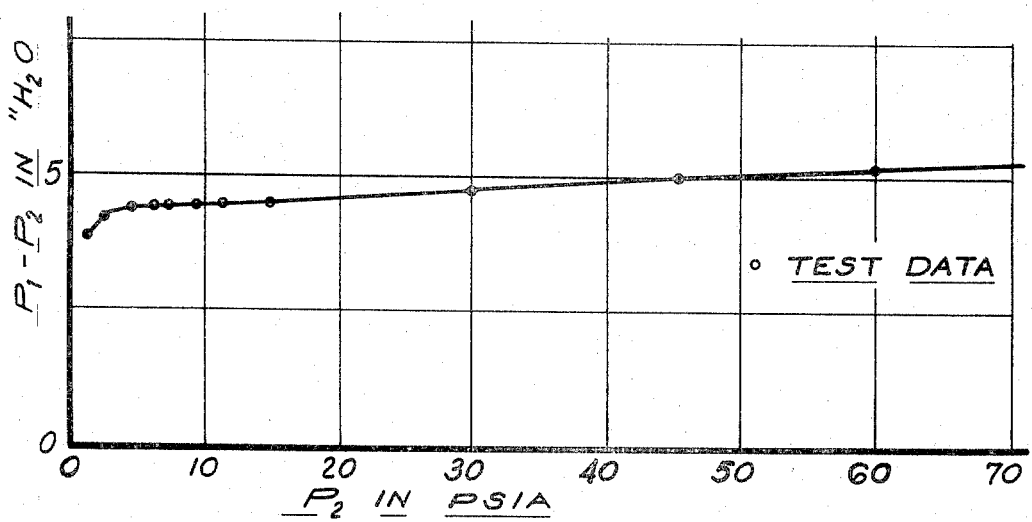
FIGURE 5 is a curve showing the relationship between pressure differential, $P_1-P_2$, and pressure, $P_2$, for various pressures $P_2$.

Referring to the curve of FIGURE 5, it has been found that the pressure differential $P_1-P_2$ across laminar flow restriction 28 tends to increase slightly as pressure $P_2$ increases at a given temperature of the gas flowing through conduit 22. The curve of FIGURE 5 indicates test data obtained by flowing heated air through restrictions 28 and 30 of the same dimensions as set forth in regard to the curve of FIGURE 5. This pressure level effect may be minimized by forming choked restriction 30 from thin plate since the length of restriction 30 appears to have a decided effect on the above mentioned relationship between the pressure differential $P_1-P_2$ and pressure $P_2$. However, the pressure $P_2$ effect may be compensated by the arrangement shown in FIGURE 2 wherein the conduit 40 containing subsonic flow restriction 42 and choked or sonic flow restriction 44 is in parallel flow relationship with conduit 22 containing laminar flow restriction 28 and choked or sonic flow restriction 30. With subsonic flow through restriction 42 and sonic flow through restriction 44, the pressure differential $P_1-P_2'$ across restriction 42 is proportional to the pressure $P_1$ in accordance with the area ratio of restrictions 42 and 44. Reference is made to Patent No. 2,950,596 issued Aug. 30, 1960, to E. A. Haase et al. for details of fluid flow and pressure relationship in a flow circuit having two restrictions in series. By suitable selection of restrictions 42 and 44 with the appropriate area ratio, the $P_1-P_2'$ pressure differential can be utilized to cancel the abovementioned pressure level effect on the pressure differential $P_1-P_2$. To that end, the pressure gauge 32 is connected to respond to the $P_2'-P_2$ pressure differential thereby producing an output pressure signal which is independent of pressure level.

Figure 3:
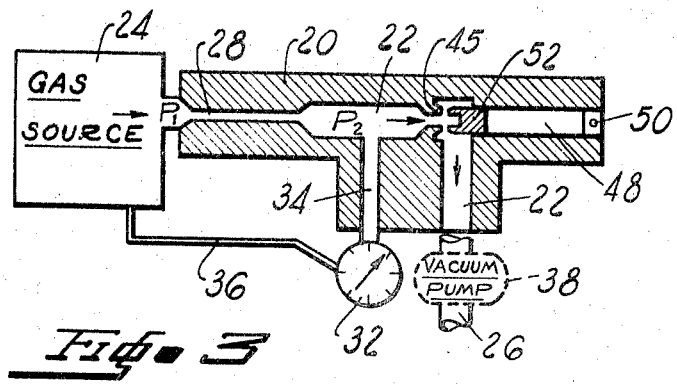
FIGURE 3 is a schematic representation of a fluid pressure regulator embodying the present invention with means for compensating temperature variations.

Referring to FIGURE 3, structure similar to that of FIGURE 1 is identified by like numerals. In the arrangement of FIGURE 3, the choked restriction 45 is made variable as a function of temperature T to thereby cancel the temperature effect on the pressure differential $P_1-P_2$ across laminar flow restriction 28 in the event that it is desired to utilize applicant's device as a control mechanism wherein a fixed gas pressure differential $P_1-P_2$ is maintained regardless of the temperature of the gas. The laminar flow restriction 28 is in series with and upstream from a variable area choked or sonic flow restriction 45. A temperature responsive member 48 mounted in casing 20 is fixedly secured at one end thereof to casing 20 by a pin 50. The opposite end of member 48 is provided with a valve element 52 fixedly secured thereto and adapted to move toward or away from choked restriction 45 to thereby vary the effective flow area thereof accordingly in response to expansion or contraction of member 48 as a result of temperature T variations of the gas flow through conduit 22. The member 48 is selected to have greater thermal expansion than the casing 20 to thereby effect a differential thermal expansion to compensate for casing 20 expansion or contraction which, in turn, results in an increase or decrease in flow area of restriction 45 in response to a decrease or an increase, respectively, of temperature T.

Various changes and modifications of the above described structure may be made as will be recognized by those persons skilled in the art without departing from the scope of applicant's invention as defined by the following claims.

I claim:

1. A gas pressure regulating device comprising:
   a first source of gas at variable pressure;
   a second source of pressurized gas wherein the gas pressure relative to said first source is lower by a ratio of at least two;
   a first flow conduit connecting said first and second sources;
   a laminar flow restriction in said first flow condit;
   a choked or sonic flow restriction in said first flow laminar flow restriction;
   a second flow conduit connected in parallel to said first flow conduit;
   a subsonic flow restriction in said second flow conduit;
   a choked or sonic flow restriction in said second conduit downstream from an in series with said subsonic flow restriction;
   gas pressure differential responsive means opertaively connected to said first flow conduit intermediate said laminar flow and sonic flow restrictions therein and said second flow conduit intermediate said subsonic flow restrictions therein to respond to the gas pressure differential betwen said first and second flow conduits.

2. A gas pressure device as claimed in claim 1 wherein said gas pressure differential varies as a known function of the temperature of the gas flow through said first flow conduit.

3. A gas pressure regulating device as claimed in claim 2 wherein:
   the gas pressure intermediate said subsonic and choked restrictions in said second conduit varies as a known function of the gas pressure upstream from said subsonic restriction;
   the differential between the gas pressures upstream from said laminar flow restriction and intermediate said laminar flow restriction and said choke restriction in said first conduit varying as a known function of said gas temperature and further varying with the gas pressure intermediate said laminar flow restriction and associated choked restriction for a given gas temperature;

said gas pressure differential between said first and second flow conduits varying as a known function of said gas temperature regardless of the gas pressure intermediate said laminar flow restriction and associated choked restriction.

4. A gas pressure regulating device as claimed in claim 2 wherein said gas pressure differential varies substantially in proportion to said gas temperature.

5. A gas pressure regulating device as claimed in claim 1 wherein:

said first source of gas is at substantially atmospheric air pressure; and said second source of gas is at subatmospheric pressure.

References Cited

UNITED STATES PATENTS 1,630,318   5/1927   Tate.

LOUIS R. PRINCE, *Primary Examiner.*

D. O. WOODIEL, *Assistant Examiner.*

U.S. Cl. X.R.

73—205, 368

U.S. DEPARTMENT OF COMMERCE
PATENT OFFICE
Washington, D.C. 20231

UNITED STATES PATENT OFFICE
CERTIFICATE OF CORRECTION

Patent No. 3,438,258　　　　　　　　　　　　　　　April 15, 196

James M. Eastman

It is certified that error appears in the above identified patent and that said Letters Patent are hereby corrected as shown below:

Column 4, lines 36 and 37, cancel "as defined by the following claims."; line 47, after "flow", second occurrence, insert -- conduit downstream from and in series with said --; line 53, "an" should read -- and --; line 55, "opertaively" should read -- operatively --.

Signed and sealed this 14th day of April 1970.

(SEAL)
Attest:

Edward M. Fletcher, Jr.　　　　　　　　　　WILLIAM E. SCHUYLER, J
Attesting Officer　　　　　　　　　　　　　　Commissioner of Patent